(12) United States Patent
Chung et al.

(10) Patent No.: US 9,318,264 B2
(45) Date of Patent: Apr. 19, 2016

(54) MULTILAYER CERAMIC DEVICE

(71) Applicant: Samsung Electro-Mechanics Co., Ltd., Suwon-si, Gyeonggi-do (KR)

(72) Inventors: Hae Sock Chung, Suwon-si (KR); Doo Young Kim, Suwon-si (KR); Ki Won Kim, Busan (KR); Tae Jin Jang, Suwon-si (KR); Hyun Hee Gu, Suwon-si (KR); Ji Hee Moon, Busan (KR); Jin Hyung Lim, Suwon-si (KR); Youn Sik Jin, Suwon-si (KR); Byung Jun Jeon, Suwon-si (KR)

(73) Assignee: SAMSUNG ELECTRO-MECHANICS CO., LTD., Suwon, Gyeonggi-Do (KR)

( * ) Notice: Subject to any disclaimer, the term of this patent is extended or adjusted under 35 U.S.C. 154(b) by 124 days.

(21) Appl. No.: 14/189,915

(22) Filed: Feb. 25, 2014

(65) Prior Publication Data

US 2014/0240899 A1    Aug. 28, 2014

(30) Foreign Application Priority Data

Feb. 26, 2013    (KR) .................. 10-2013-0020384

(51) Int. Cl.
*H01G 4/258* (2006.01)
*H01G 4/30* (2006.01)
*H01G 4/232* (2006.01)
*H01G 4/005* (2006.01)

(52) U.S. Cl.
CPC ............. *H01G 4/258* (2013.01); *H01G 4/2325* (2013.01); *H01G 4/30* (2013.01); *H01G 4/005* (2013.01)

(58) Field of Classification Search
CPC ......... H01G 4/005; H01G 4/01; H01G 4/228; H01G 4/232; H01G 4/2325; H01G 4/30
See application file for complete search history.

(56) References Cited

U.S. PATENT DOCUMENTS

2013/0258546 A1* 10/2013 Kim .................. H01G 4/12
                                                361/301.4
2013/0294006 A1* 11/2013 Kang ............... H01G 4/2325
                                                361/301.4

FOREIGN PATENT DOCUMENTS

| JP | 2000-106035 | A | 4/2000 |
| JP | 2009-283744 | A | 5/2008 |
| JP | 4586141 | B2 | 11/2010 |
| KR | 1992-0019224 | A | 10/1992 |
| KR | 10-2006-0047733 | A | 5/2006 |
| KR | 10-2008-0111557 | A | 12/2008 |

* cited by examiner

*Primary Examiner* — Dion R Ferguson
(74) *Attorney, Agent, or Firm* — McDermott Will & Emery LLP

(57) ABSTRACT

Disclosed herein is a multilayer ceramic device, including a device body; an inner electrode arranged in the device body; and an external electrode arranged at outside of the device body and being electrically connected to the inner electrode; wherein the external electrode includes: an inner layer covering the device body; an outer layer covering the inner layer and being exposed to the outside; and an intermediate layer arranged between the inner layer and the outer layer, and made of a mixture of a copper metal and a resin, a surface of the copper metal being coated with an oxide film.

9 Claims, 2 Drawing Sheets ns of the United States Patent and Trademark Office.

MULTILAYER CERAMIC DEVICE

CROSS REFERENCE(S) TO RELATED APPLICATIONS

This application claims the benefit under 35 U.S.C. Section 119 of Korean Patent Application Serial No. 10-2013-0020384, entitled "Multilayer Ceramic Device" filed on Feb. 26, 2013, which is hereby incorporated by reference in its entirety into this application.

BACKGROUND OF THE INVENTION

1. Technical Field

The present invention relates to a multilayer ceramic device, and more particularly, to a multilayer ceramic device in which functional deterioration of the device due to a crack is prevented and a heat-resistant characteristic for an external device of the device is enhanced.

2. Description of the Related Art

Chip components such as typical thin film multilayer ceramic condensers (MLCC) include a device body, an internal electrode, and an external electrode. The device body has a structure in which a plurality of dielectric sheets, referred to as green sheets, are stacked, and the internal electrode is provided on each of the dielectric sheets. Further, the external electrode is electrically connected to the internal electrode and covers both ends of the device body.

Normally, since multilayer ceramic devices are designed to focus on improvement of device characteristics, they are relatively vulnerable to physical pressure or impact, thermal impact, vibrations and the like from the outside. Therefore, a crack occurs in the device body when a physical or thermal impact is applied to a multilayer ceramic device. Usually, a crack occurs on a surface of the device body adjacent to an end of the external electrode and then propagates inward of the device body.

A technology to prevent damage on chip components caused by a crack is known in which an external electrode is made capable of absorbing impact from the outside. For example, the external electrode may include an internal metal layer to directly cover the device body, an external metal layer exposed to the outside, and an intermediate layer between the internal metal layer and the external metal layer. When impact is applied from the outside, the intermediate layer is separated from the internal metal layer to absorb the impact, thereby keeping the chip components normally operable despite of a bending crack occurrence.

However, the intermediate layer is made of mixture of a metal and a polymer resin, and the polymer resin is thermo-degraded during a high temperature process for manufacturing the chip components, such that the intermediate layer and the internal metal layer has a gap therebetween, thereby causing a void. Such void and delamination problems are matters of a chip component itself, irrelevant to the operation of an electronic device having the chip component therein, resulting in deterioration of the chip component.

RELATED ART DOCUMENT

Patent Document (Patent Document 1) Korean Patent Laid-Open Publication No. 10-2006-0047733

SUMMARY OF THE INVENTION

An object of the present invention is to provide a multilayer ceramic device which is operable despite of a crack caused by impact from the outside.

Another object of the present invention is to provide a multilayer ceramic device in which a heat resistant characteristic of its external electrode is enhanced.

Still another object of the present invention is to provide a multilayer ceramic device in which delamination of external electrodes stacked on one another during a high temperature process is prevented.

According to an exemplary embodiment of the present invention, there is provided a multilayer ceramic device, including: a device body; an inner electrode arranged in the device body; and an external electrode arranged at outside of the device body and being electrically connected to the inner electrode; wherein the external electrode includes: an inner layer covering the device body; an outer layer covering the inner layer and being exposed to outside; and an intermediate layer arranged between the inner layer and the outer layer, and made of a mixture of a copper metal and a resin, a surface of the copper metal being coated with a oxide film.

The oxide film may have a thickness of less than 102 nm.

The oxide film may have a thickness of more than 4 nm.

The oxide film may have a thickness of more than 4 nm and less than 102 nm.

The metal may include copper (Cu) and the resin may include an epoxy resin.

The intermediate layer may be a soft electrode layer which is separated from the inner layer when it absorbs impact from the outside.

The inner layer may include at least one of: copper (Cu), silver (Ag), nickel (Ni) and tin (Sn), and the outer layer may include at least one of: nickel (Ni) and tin (Sn).

The device body may have sides and circumferential surfaces connecting the sides, and the external electrode may have a front portion which covers the sides, and a band portion which extends from the front portion to cover parts of the circumferential surfaces.

DESCRIPTION OF THE PREFERRED EMBODIMENTS

Figure 1:
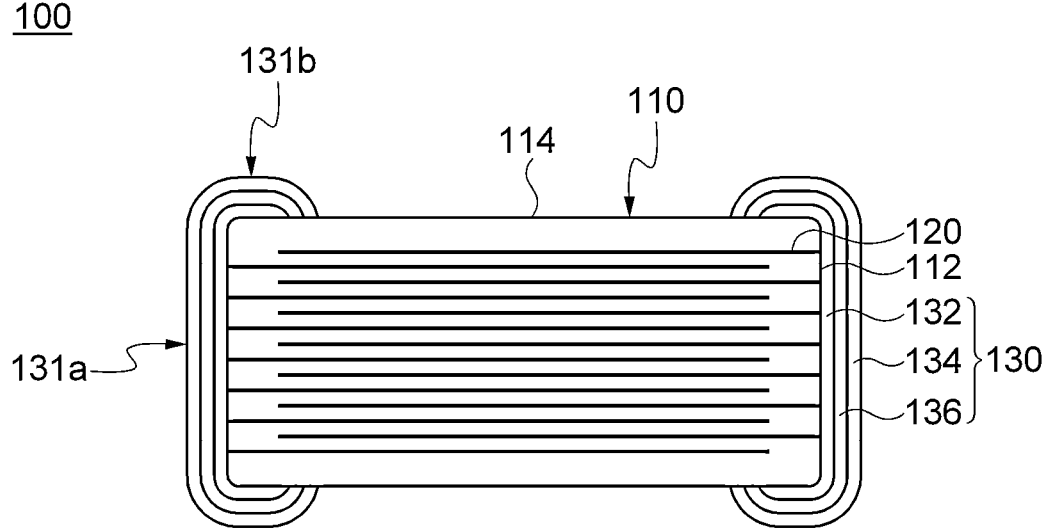
FIG. 1 is a view showing a multilayer ceramic device according to an exemplary embodiment of the present invention.

Various advantages and features of the present invention and methods for accomplishing the same will become apparent from the following descriptions of exemplary embodiments with reference to the accompanying drawings. However, the present invention may be modified in many different ways and it should not be considered to be limited to the embodiments set forth herein. Rather, these embodiments may be provided so that this disclosure will be thorough and complete, and will fully convey the scope of the invention to those skilled in the art. Like reference numerals throughout the specification denote like elements.

Terms used in the present specification are for explaining the embodiments rather than limiting the present invention. Unless specifically mentioned otherwise, a singular form includes a plural form in the present specification. Throughout this specification, the word "comprise" and variations such as "comprises" or "comprising," will be understood to imply the inclusion of stated constituents, steps, operations and/or elements but not the exclusion of any other constituents, steps, operations and/or elements.

Further, the exemplary embodiments described in the specification will be described with reference to cross-sectional views and/or plan views that are ideal exemplification figures. In the drawings, the thickness of layers and regions is exaggerated for efficient description of technical contents. Therefore, exemplified forms may be changed by manufacturing technologies and/or tolerance. Therefore, the exemplary embodiments of the present invention are not limited to specific forms but may include the change in forms generated according to the manufacturing processes. For example, an etching region with a square shape may be rounded or may have a predetermined curvature.

Hereinafter, a multilayer ceramic device and a method for manufacturing the same according to exemplary embodiments of the present invention will be described in detail with reference to the accompanying drawings.

Figure 2:
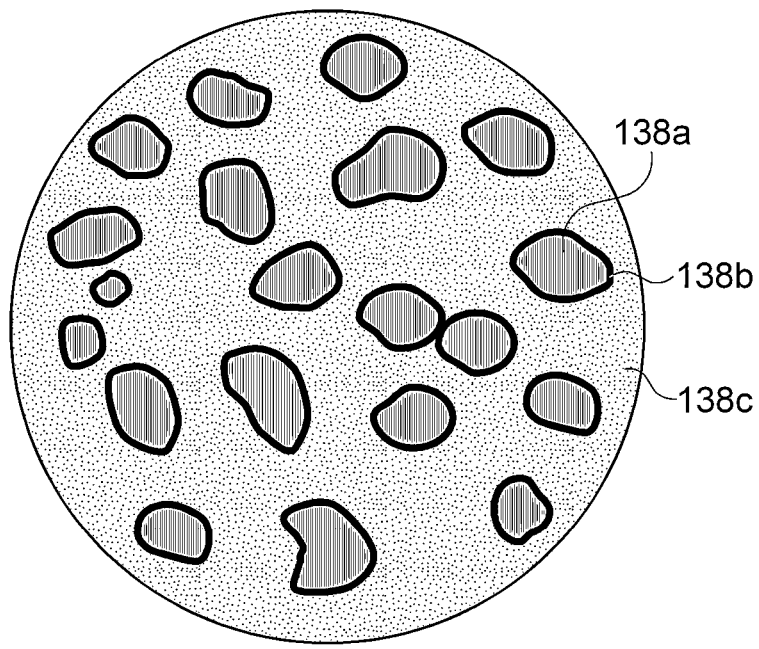
FIG. 2 is a view showing the composition of the intermediate layer shown in FIG. 1.
Figure 3:
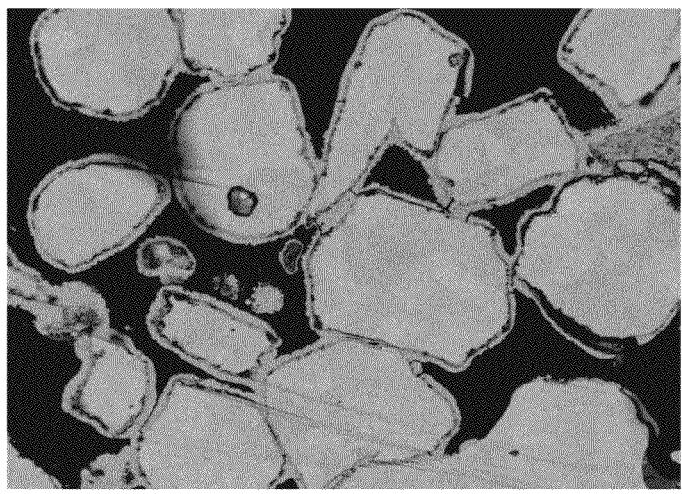
FIG. 3 is a photograph showing the composition of the intermediate layer of an external electrode of a multilayer ceramic device according to an exemplary embodiment of the present invention.

FIG. 1 is a view showing a multilayer ceramic device according to an exemplary embodiment of the present invention; and FIG. 2 is a view showing the composition of the intermediate layer shown in FIG. 1. FIG. 3 is a photograph showing the composition of the intermediate layer of an external electrode of a multilayer ceramic device according to an exemplary embodiment of the present invention.

Referring to FIGS. 1 and 2, the multilayer ceramic device 100 according to the exemplary embodiment of the invention may include a device body 110, internal electrodes 120, and external electrodes 130.

The device body 110 may have a multilayer structure in which a plurality of sheets are stacked on one another. Such sheets may be dielectric sheets which are so-called "green sheets," and stacked in a generally hexahedron shape. The device body 110 may have two sides 112 and four circumferential edges 114 connecting the sides to each other.

The internal electrodes 120 may be arranged in generally parallel to the longitudinal direction of the device body 110. The internal electrodes 120 may be circuit patterns formed on the respective sheets. The internal electrodes 120 may be metal patterns contacting on the external electrodes 130. Each of the internal electrodes 120 may be formed on the respective sheets, and may be extended inward of the device body 110 from the sides 112. Optionally, the internal electrodes 120 may further include floating patterns. The floating patterns may be arranged between sides 112 in the device body 110 without having contacts with the external electrodes 130.

The external electrodes 130 may cover both ends of the device body 110. The external electrode 130 consists of a front portion 131a which covers the side 112, and a band portion 131b which extends from the front portion 131a to cover parts of the circumferential edges 114. The band portion 131b may be a bonding portion for bonding the multilayer ceramic device 100 to an external device (not shown) such as a circuit board.

The external electrode 130 may have a multilayer structure. As an example, the external electrode 130 may have an inner layer 132, an outer layer 134 and an intermediate layer 136. The inner layer 132 may be the innermost electrode layer directly covering both ends of the device body 110. The inner layer 132 may be formed of a variety of metals. For example, the inner layer 132 may be formed of a metal material comprising at least one of copper (Cu) and silver (Ag). The outer layer 134 may be the outermost electrode layer of the external electrode exposed to the outside. The outer layer 134 covers the inner layer 132 and may be formed of a variety of metals. For example, the outer layer 134 may be formed of a metal material comprising at least one of nickel (Ni) and tin (Sn).

The intermediate layer 136 may be interposed between the inner layer 132 and the outer layer 134. When impact is applied to the multilayer ceramic device 100 from the outside, the intermediate layer 136 may serve to absorb the impact. As an example, when impact is applied from the outside, the intermediate layer 136 may serve as a so-called soft electrode layer which is separated from the inner layer 132 to absorb the impact. Even though the intermediate layer 136 is separated from the inner layer 132, the multilayer ceramic device 100 is still normally operable. More specifically, if the intermediate layer 136 is separated from the inner layer 132, even though capacitance may be decreased somewhat, which resulted from a crack in the device body 110 caused by the impact, insulation resistance is not decreased. Therefore, no critical defect occurs and the function of the device may be maintained.

The intermediate layer 136 may be manufactured as a metal-resin mixture 138 of a metal, which is coated with a certain oxide film, and a resin. As an example, the metal-resin mixture 138 may include a metal 138a, an oxide film 138b coating the metal 138a, and a polymer resin 138c. The metal 138a coated with the oxide film 138b may be distributed generally uniformly in the polymer resin 138c. The composition of the intermediate layer 136 manufactured with the metal-resin mixture 138 is shown in FIG. 3.

The metal 138a may provide for electrical connection between the inner layer 132 and the outer layer 134. As the metal 138a, a copper metal (Cu metal) on surface of which an oxide film is formable or easily formed. As an example, a copper metal (Cu metal) may be used as the metal 138a. If the metal 138a is made of a metal such as silver (Ag) other than copper, on surface of which an oxide film is not easily formed, it may be difficult to apply a technique for controlling the oxide film to a desired thickness.

The oxide film 138b may be provided for increasing a heat resistant characteristic of the intermediate layer 136. The polymer resin 138c may be provided for absorbing stress by providing an appropriate bonding force and flexibility to the inner layer 132 and the outer layer 134 in the intermediate layer 136. Further, since the intermediate layer 136 is mainly made of the polymer resin 138c and the metal 138a, it is possible to decrease or increase the content of the metal 138a by increasing or decreasing the content of the polymer resin 138c. Thus, by adjusting the content of the polymer resin 138c, the relative content of the metal 138a is adjusted, such that conductivity of the intermediate layer 136 may be adjusted.

The thickness of the oxide film 138b may be adjusted so as to allow the intermediate layer 136 to serve as the soft electrode layer mentioned above. For example, if the thickness of the oxide film 138b is significantly thick, it may be difficult to perform the function of preventing the polymer resin 138c from being thermodegraded during a process for coupling the multilayer ceramic device 100. When the multilayer ceramic device with the metal-resin mixture 138 is coupled at 250° C. to 300° C., it can be seen that the polymer resin 138c is thermodegraded so that the weight of the metal-resin mixture 138 is reduced. However, in the case of the metal-resin mixture in which the oxide film formation is suppressed, it can be seen that the thermodegradation temperature of the polymer resin is increased. This may be interpreted that suppressing formation of the oxide film enhances a heat resistant characteristic of the intermediate layer 136. Accordingly, it is preferable that the thickness of the oxide film 138b is equal to or less than the maximum thickness which ensures a heat resistant characteristic of the intermediate layer 136.

Here, the thickness of the oxide film 138b may mean an average thickness. In other words, although the appropriate values for the thickness of the oxide film 138b have been described assuming that the oxide film is formed generally uniformly on the surface of the metal 138a, it is also possible that the thickness of the oxide film 138b may be uninformed locally in the metal-resin mixture 138. That is, instead of coating the entire surface of the metal 138a with a constant thickness of the oxide film 138b, the oxide film 138b may be coated ununiformly and may have ununiform shapes. Accordingly, a desirable thickness of the oxide film 138b may mean an average thickness coating the surface of the metal 138a throughout the metal-resin mixture 138.

Such a metal-resin mixture 138 may be manufactured by performing the process of forming the oxide film 138b on the metal 138a to obtain an oxide metal particle, and then mixing the result with a polymer resin 138c.

EXAMPLE 500 multilayer ceramic devices with the size 1.6 mm×0.8 mm×0.8 mm of and the capacitance of 1 nF were manufactured. Here, the external electrode of the multilayer ceramic device is separately manufacture as a normal structure (with an electrode in Cu layer only) and as a soft electrode structure (with an intermediate layer as well as the electrode in Cu layer). In the case of the manufactured soft electrode structure, in order to evaluate the effects on the metal oxide film, the curing process for curing the external electrode among the manufacturing process of the multilayer ceramic device, was performed under different atmosphere conditions, in order to manufacture a number of samples. Here, as indicated in Table 1, the curing atmosphere was controlled by adjusting a flux rate between nitrogen gas (N2) and air. In addition, the thickness of the metal oxide film in the intermediate layer of the resulting samples was measured by scanning electron microscopy (SEM).

For flexural strength evaluation, 50 samples under different conditions were bent to 5 mm at 1 mm/sec, and those sample having capacitances deviating from the initial capacitance by ±10% or more were determined as failure.

For delamination evaluation, 100 samples under different conditions had been dipped in a solder bath at about 290° C. for 5 seconds, and a DPA were performed.

For coating failure evaluation, 100 samples under different conditions had been dipped in a solder bath at about 240° C. for 5 seconds, and those samples having failed to cover 95% or more of the electrode area were counted.

For humidity resistant characteristic evaluation, 500 samples under different conditions were kept at about 85° C., 85% (RH), 200V for about 15 hours, and those samples having IR of 104 ohm or less were determined as being failed.

The above flexural strength evaluation, delamination evaluation, coating failure evaluation and humidity resistant evaluation classified by the thickness of the oxide film are summarized in Table 1 below:

TABLE 1

| No | Type of external electrode | Flus rate (Air/N$_2$) | Thickness of oxide film (nm) | Flexural strength | Delamination (nm) | Plating faliure | Humidity resistance |
|---|---|---|---|---|---|---|---|
| 1 | Normal | — | N/A | 27/50 | — | 0/500 | 11/500 |
| 2 | Soft term | 0.00 | N/A | 0/50 | 0/100 | 32/500 | 0/500 |
| 3 | Soft term | 0.05 | 2 | 0/50 | 0/100 | 17/500 | 0/500 |
| 4 | Soft term | 0.10 | 4 | 0/50 | 0/100 | 5/500 | 0/500 |
| 5 | Soft term | 0.14 | 6 | 0/50 | 0/100 | 0/500 | 0/500 |
| 6 | Soft term | 0.18 | 15 | 0/50 | 0/100 | 0/500 | 0/500 |
| 7 | Soft term | 0.20 | 27 | 0/50 | 0/100 | 0/500 | 0/500 |
| 8 | Soft term | 0.23 | 64 | 0/50 | 0/100 | 0/500 | 0/500 |
| 9 | Soft term | 0.26 | 99 | 0/50 | 0/100 | 0/500 | 0/500 |
| 10 | Soft term | 0.31 | 102 | 4/50 | 8/100 | 0/500 | 3/500 |
| 11 | Soft term | 0.35 | 118 | 12/50 | 21/100 | 0/500 | 12/500 |

As can be seen from Table 1, in the samples of the normal structure where the soft electrode structure is not employed, no abnormality was found for the delamination and plating failure evaluation. However, for the flexural strength evaluation, 27 out of a total of 50 samples were measured to deviate from the initial capacitance by 10% or more, and for the humidity resistant evaluation, 11 out of a total of 500 samples were observed to have IR of $10^4$ ohm or less. Therefore, it is seen that the structure having the intermediate layer which is the soft electrode in the external electrode is superior in flexural strength and humidity resistant characteristic compared to the normal structure not having the intermediated layer.

Among the samples having the soft electrode structure, in the case where the thickness of the oxide film is about 4 nm or less, even though no abnormality was found in flexural strength evaluation, delamination evaluation and humidity resistant evaluation, but plating failure occurred. Therefore, it was noted that the minimum thickness of the oxide film to prevent plating failure is 4 nm. On the other hand, in the case where the thickness of the oxide film is about 102 nm or more, failure was found in flexural strength evaluation, delamination evaluation and humidity resistant evaluation. Therefore, it was noted that the maximum thickness of the oxide film to prevent problems relating to flexural strength, delamination and humidity resistant is 102 nm.

As describe above, the multilayer ceramic device 100 according to an exemplary embodiment of the present invention includes the external electrode 130 covering both ends of the device body 110, in which the external electrode 130 has the intermediate layer 136 that serves as the soft electrode layer interposed between the inner layer 132 and outer layer 134, and the intermediate layer 136 may be made of the metal-resin mixture 138 of the oxide film 138b, which coats the surface of the metal 138a with an appropriate thickness, and the polymer resin 138c. In this configuration, a heat resistant characteristic of the intermediate layer 136 is enhanced, such that, during the process of manufacturing the multilayer ceramic device 100, delamination between the inner layer 132 and the outer layer 134 due to thermodegradation of the polymer resin 138c in the intermediate layer 136 is prevented. Accordingly, in the multilayer ceramic device according to the exemplary embodiment of the present invention, the intermediate layer which covers both ends of the device body and serves as a soft electrode layer interposed between the inner and outer layers is manufactured with a metal-resin mixture of a metal, surface of which is coated with the oxide film of an appropriate thickness, and a polymer resin, such that the heat resistant characteristic of the intermediate layer is enhanced, thereby preventing the failure of the external electrode due to the thermodegradation of the polymer resin during the process of coupling the multilayer ceramic device.

As stated above, in the multilayer ceramic device according to the exemplary embodiment of the present invention, the intermediate layer which covers both ends of the device body and serves as a soft electrode layer interposed between the inner and outer layers is manufactured with a metal-resin mixture of a metal, surface of which is coated with the oxide film of an appropriate thickness, and a polymer resin, such that the heat resistant characteristic of the intermediate layer is enhanced, thereby preventing the failure of the external electrode due to the thermodegradation of the polymer resin during the process of manufacturing the multilayer ceramic device.

The present invention has been described in connection with what is presently considered to be practical exemplary embodiments. In addition, the above-mentioned description discloses only the exemplary embodiments of the present invention. Therefore, it is to be appreciated that modifications and alterations may be made by those skilled in the art without departing from the scope of the present invention disclosed in the present specification and an equivalent thereof. The exemplary embodiments described above have been provided to explain the best mode in carrying out the present invention. Therefore, they may be carried out in other modes known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A multilayer ceramic device, comprising:
   a device body;
   an inner electrode arranged in the device body; and
   an external electrode arranged at outside of the device body and being electrically connected to the inner electrode,
   wherein the external electrode includes:
   an inner layer covering the device body;
   an outer layer covering the inner layer and being exposed to the outside; and
   an intermediate layer arranged between the inner layer and the outer layer, and made of a mixture of a copper metal particle and a resin, a surface of the copper metal particle being coated with an oxide film.

2. The device according to claim 1, wherein the oxide film has a thickness of less than 102 nm.

3. The device according to claim 1, wherein the oxide film has a thickness of more than 4 nm.

4. The device according to claim 1, wherein the resin includes an epoxy resin.

5. The device according to claim 1, wherein the intermediate layer is a soft electrode layer which is separated from the inner layer when it absorbs impact from the outside.

6. The device according to claim 1, wherein the inner layer includes at least one of: copper (Cu), silver (Ag), nickel (Ni) and tin (Sn), and the outer layer includes at least one of: nickel (Ni) and tin (Sn).

7. A multilayer ceramic device, comprising:
   an external electrode having a multilayer structure for connecting the multilayer ceramic device to an external electronic device,
   wherein an intermediate layer serving as a soft electrode layer between outermost layers in the multilayer structure is made of a mixture of a copper metal particle and a resin, a surface of the copper metal particle being coated with a oxide film.

8. The device according to claim 7, wherein the oxide film has a thickness of less than 102 nm.

9. The device according to claim 7, wherein the oxide film has a thickness of more than 4 nm.

* * * * *